(12) United States Patent
Fendt et al.

(10) Patent No.: US 12,244,692 B2
(45) Date of Patent: Mar. 4, 2025

(54) METHOD AND SYSTEM FOR LICENSING AND DELIVERING KEYS FOR SENSORS AND RECEIVERS

(71) Applicant: Diehl Metering Systems GmbH, Nuremberg (DE)

(72) Inventors: Charles Fendt, Stein (DE); Achim Schmidt, Weissenohe (DE)

(73) Assignee: Diehl Metering Systems GmbH, Nuremberg (DE)

( * ) Notice: Subject to any disclaimer, the term of this patent is extended or adjusted under 35 U.S.C. 154(b) by 264 days.

(21) Appl. No.: 17/728,102

(22) Filed: Apr. 25, 2022

(65) Prior Publication Data

US 2022/0247556 A1    Aug. 4, 2022

Related U.S. Application Data

(63) Continuation of application No. PCT/EP2020/078644, filed on Oct. 12, 2020.

(30) Foreign Application Priority Data

Oct. 25, 2019   (DE) .................... 10 2019 007 447.5

(51) Int. Cl.
*H04L 9/08*     (2006.01)
*H04L 9/14*     (2006.01)

(52) U.S. Cl.
CPC ............ *H04L 9/0825* (2013.01); *H04L 9/085* (2013.01); *H04L 9/0866* (2013.01); *H04L 9/14* (2013.01)

(58) Field of Classification Search
None
See application file for complete search history.

(56) References Cited

U.S. PATENT DOCUMENTS

| 5,970,147 | A | 10/1999 | Davis | |
|---|---|---|---|---|
| 7,565,698 | B2 * | 7/2009 | Isozaki | H04L 63/061 380/255 |
| 8,279,038 | B2 | 10/2012 | Lefebvre | |
| 10,972,912 | B1 * | 4/2021 | Krishnamoorthy | H04L 9/3247 |

(Continued)

FOREIGN PATENT DOCUMENTS

| CN | 108628658 B * | 4/2022 | ........... G06F 21/105 |
|---|---|---|---|
| DE | 102005053332 A1 | 5/2007 | |

(Continued)

*Primary Examiner* — Saleh Najjar
*Assistant Examiner* — Shadi H Kobrosli
(74) *Attorney, Agent, or Firm* — Laurence A. Greenberg; Werner H. Stemer; Ralph E. Locher

(57) ABSTRACT

A method for licensing a sensor at a central body, a method for licensing a receiver at a central body, a method for providing a list of sensor keys by using a central body, a method for registering a licensed sensor on a licensed receiver and a system for transmitting data from a licensed sensor to a licensed receiver, allow sensors and receivers to be licensed while also simultaneously ensuring secure delivery of the transmission key for communication purposes or for data exchange between the sensors and the receivers. The transmission key can be transmitted in an encrypted matter and there is no need to transmit the transmission key in an unencrypted manner. It is also possible to establish a licensing model for sensors and receivers by virtue of the secure delivery of the transmission key.

18 Claims, 5 Drawing Sheets

(56) References Cited

U.S. PATENT DOCUMENTS

| | | | |
|---|---|---|---|
| 11,146,379 B1* | 10/2021 | Ackley-Smith | H04L 9/0825 |
| 11,316,666 B2* | 4/2022 | Leavy | H04L 9/0841 |
| 2009/0290716 A1* | 11/2009 | O'Connor | G06F 21/10 |
| | | | 380/278 |
| 2010/0153736 A1 | 6/2010 | Kilian | |
| 2017/0041794 A1* | 2/2017 | Lee | H04W 12/06 |
| 2017/0168777 A1 | 6/2017 | Britt | |
| 2018/0107997 A1* | 4/2018 | Dhankani | G06Q 20/1235 |
| 2019/0081936 A1* | 3/2019 | Sayers | H04L 9/0891 |
| 2019/0180023 A1 | 6/2019 | Robl | |
| 2019/0245701 A1 | 8/2019 | Chen et al. | |
| 2019/0281052 A1* | 9/2019 | Lekkas | H04L 9/14 |
| 2020/0273586 A1* | 8/2020 | Lee | H04L 9/0891 |
| 2020/0280436 A1* | 9/2020 | Nix | H04L 9/3066 |
| 2021/0083842 A1* | 3/2021 | Cugi | H04N 21/4408 |

FOREIGN PATENT DOCUMENTS

| | | | | |
|---|---|---|---|---|
| DE | 102006035526 A1 | 1/2008 | | |
| DE | 102008045315 A1 | 3/2010 | | |
| EP | 2388969 B1 * | 12/2018 | ........... | G06F 16/284 |
| GB | 2570292 A | 7/2019 | | |
| WO | 2013020172 A1 | 2/2013 | | |

* cited by examiner

METHOD AND SYSTEM FOR LICENSING AND DELIVERING KEYS FOR SENSORS AND RECEIVERS

CROSS-REFERENCE TO RELATED APPLICATION

This application is a continuation, under 35 U.S.C. § 120, of copending International Patent Application PCT/EP2020/078644, filed Oct. 12, 2020, which designated the United States; this application also claims the priority, under 35 U.S.C. § 119, of German Patent Application DE 10 2019 007 447.5, filed Oct. 25, 2019; the prior applications are herewith incorporated by reference in their entirety.

FIELD AND BACKGROUND OF THE INVENTION

The present invention relates to a method for licensing a sensor at a central body, including the sensor, the central body including a computer system and a database, and a sensor manufacturer including a computer system, wherein a data connection exists between the sensor manufacturer and the central body. The invention also relates to a method for licensing a receiver at a central body, including the receiver, the central body including a computer system and a database, and a receiver manufacturer including a computer system, wherein a data connection exists between the receiver manufacturer and the central body, in particular in conjunction with the method described above. The invention additionally relates to a method for providing a list of sensor-keys by a central body, preferably in conjunction with one of the methods described above. The invention further relates to a method for registering a licensed sensor as described above on a licensed receiver, in particular as described herein, including the sensor, the receiver, and the central body including a computer system and a database, wherein a data connection exists between the sensor and the receiver, and a data connection exists between the receiver and the central body. The invention finally relates to a system for transmitting data from a licensed sensor to a licensed receiver.

Some transport technologies, such as MIOTY, operate by using device-specific licenses. Subscribers with individual encryption need a secure key delivery. Both the sensors that act as transmitters and the receivers that perform the tasks of data processors must be licensed. The keys used for the data and message exchange are transmitted as plain text.

The Elliptic Curve Integrated Encryption Scheme (ECIES) is a hybrid encryption method based on elliptical curves. As a hybrid method, it combines an asymmetric method that is used to send a symmetric key with a symmetric encryption method that uses that symmetric key to encrypt the message. For asymmetric encryption, an encryption method based on Elliptic Curve Cryptography (ECC) can be used.

SUMMARY OF THE INVENTION

It is accordingly an object of the invention to provide a novel method for licensing and key exchange for sensors and receivers, as well as a system for transmitting data, which overcome the hereinafore-mentioned disadvantages of the heretofore-known methods and systems of this general type and in which increased security and increased flexibility are possible with simultaneous licensing and key exchange.

With the foregoing and other objects in view there is provided, in accordance with the invention, a method for licensing a sensor at a central body, which comprises providing the sensor, the central body including a computer system and a database, a sensor manufacturer including a computer system, and a data connection between the sensor manufacturer and the central body, keeping a list of sensor keys in the database of the central body, generating a first key pair formed of a private and a public key at the sensor manufacturer, transmitting the public key of the first key pair from the sensor manufacturer to the central body, assigning a range of serial numbers for sensors to the first key pair, generating a second key pair formed of a private and a public key at the central body, transmitting the public key of the second key pair from the central body to the sensor manufacturer, assigning the range of serial numbers for sensors to the second key pair, storing the public key of the first key pair, the private key of the second key pair and the assigned range of serial numbers for sensors in the list of sensor keys in the central body, using the sensor manufacturer to encrypt a transmission key, which is used for data transmission between the sensor and a receiver, with the private key of the first key pair and the public key of the second key pair and to store the encrypted transmission key in the sensor, and using the sensor manufacturer to store the private key of the first key pair and the public key of the second key pair in the sensor or to additionally store the transmission key unencrypted.

The method according to the invention enables a transmission key to be stored in a sensor in an encrypted manner in such a way that on one hand, the sensor can access or decrypt this transmission key and on the other hand, the keys for decrypting this transmission key are available to a central body which acts as a licensing body, for example. An advantageous result of the method according to the invention is that the process requires only public keys to be exchanged between the parties involved, the sensor manufacturer and the central body. This makes the licensing method particularly secure, since even if the public keys are intercepted or detected by a third party during transmission, these intercepted public keys are not sufficient to decrypt the encrypted transmission key. The method for licensing a sensor is not limited to a single sensor, so that a plurality of sensors can be registered at the central body. If a plurality of sensors are licensed at the central body, it can be advantageous to keep the corresponding keys and assigned ranges of serial numbers in a list.

Advantageously, the sensor can have a unique ID that includes its unique serial number, which is in the range of serial numbers for sensors. The sensor ID can be used to associate the sensor with the corresponding entry in the list of sensor keys.

Preferably, the range of serial numbers for sensors can be assigned to the sensor manufacturer by the central body when issuing a license. For example, the central body sells a license to the sensor manufacturer for a range of serial numbers for sensors. Sensors with serial numbers that fall within this range of serial numbers for sensors can be registered at the central body in accordance with the method according to the invention for licensing a sensor, and thus be enabled for commissioning and use.

With the objects of the invention in view, there is also provided a method for licensing a receiver at a central body, which comprises providing the receiver, the central body including a computer system and a database, a receiver manufacturer including a computer system, and a data connection between the receiver manufacturer and the central body, in particular in conjunction with a method according to the invention, wherein a third key pair formed of a private and a public key is generated by the receiver manufacturer, the public key of the third key pair is transmitted from the receiver manufacturer to the central body, the third key pair is assigned a range of serial numbers for receivers, a fourth key pair formed of a private and a public key is generated at the central body, the public key of the fourth key pair is transmitted from the central body to the receiver manufacturer, the fourth key pair is assigned the range of serial numbers for receivers, and the receiver manufacturer stores the private key of the third key pair and the public key of the fourth key pair in the receiver.

In the method according to the invention for licensing a receiver, it is advantageous that only the public keys of the key pairs are exchanged between the receiver manufacturer and the central body. This also makes the method for licensing a receiver particularly secure, since even if the public keys are intercepted or detected by a third party during transmission, these intercepted public keys are not sufficient to decrypt the encrypted transmission key.

Advantageously, a list of receiver keys can be kept in the database of the central body, wherein the public key of the third key pair, the private key of the fourth key pair and the assigned range of serial numbers for receivers are stored in the list of receiver keys in the central body. The method for licensing a receiver is not limited to a single receiver, so that a plurality of receivers can be registered at the central body. If a plurality of receivers is licensed at the central body, it can be advantageous to keep the corresponding keys and assigned ranges of serial numbers in a list.

Advantageously, the sensor can have a unique ID that includes its unique serial number, which is in the range of serial numbers for sensors. The receiver ID can be used to associate the receiver with the corresponding entry in the list of receiver keys.

Preferably, the range of serial numbers for receivers can be assigned to the receiver manufacturer by the central body when issuing a license. For example, the central office can sell a license to the receiver manufacturer for a range of serial numbers for receivers. Receivers with serial numbers that fall within this range of serial numbers for receivers can be registered at the central body in accordance with the method according to the invention for licensing a receiver, and thus be enabled for commissioning and use.

With the objects of the invention in view, there is furthermore provided a method for providing a list of sensor keys by a central body, preferably in conjunction with a method for licensing a sensor according to the invention and a method for licensing a receiver according to the invention, which method comprises using the central body to encrypt the list of sensor keys with the public key of the third key pair and the private key of the fourth key pair. The list of sensor keys can therefore be obtained from the central body. However, the list of sensor keys can only be decrypted by parties that have the corresponding keys. Receivers that are licensed at the central body in accordance with the method according to the invention for licensing a receiver can decrypt the encrypted list of sensor keys, for example. The list of sensor keys in turn contains the entries of the sensors which are licensed at the central body, for example, in accordance with the method according to the invention for licensing a sensor.

It is particularly advantageous that the central location encrypts the list of sensor keys with the public key of the third key pair and the private key of the fourth key pair of each receiver, the key of which is stored in the list of receiver keys. Since the method for licensing a receiver is not limited to a single receiver, the list of sensor keys can be advantageously encrypted for each licensed receiver which is licensed at the central body, for example, in accordance with the method according to the invention for licensing a receiver. This means that all licensed receivers are able to decrypt the encrypted list of sensor keys and extract the corresponding sensor keys. On the other hand, all unlicensed receivers can be denied access to the sensor keys.

It is advantageous if the central body can publish the list of sensor keys. If a plurality of receivers is licensed, the list of sensor keys can be encrypted with the corresponding receiver keys and published in a plurality of versions that are encrypted with different receiver keys.

It is also possible for a certification authority to sign the list of sensor keys. A Certification Authority (CA) is a device that issues digital certificates. A digital certificate certifies the ownership of a public key by the subject named on the certificate. This allows other (trusted parties) to rely on signatures or statements about the private key that corresponds to the certified public key. A CA acts as a trusted third party that is trusted by both the concerned party (owner) of the certificate and the party that relies on the certificate.

With the objects of the invention in view, there is additionally provided a method for registering a licensed sensor, in particular a licensed sensor according to the invention, on a licensed receiver, in particular a licensed receiver according to the invention, by involving a central body, the method comprising providing the sensor, the receiver, the central body which includes a computer system and a database, a data connection between the sensor and the receiver, a data connection between the receiver and the central body, and a list of sensor keys according to the invention, the receiver obtains the list of sensor keys from the central body, the receiver decrypts the list of sensor keys using the private key of the third key pair and the public key of the fourth key pair, the sensor transfers the stored encrypted transmission key to the receiver, the receiver extracts the public key of the first key pair corresponding to the sensor and the private key of the second key pair from the list of sensor keys, the receiver decrypts the encrypted transmission key using the public key of the first key pair and the private key of the second key pair.

According to the method of the invention for registering a licensed sensor on a licensed receiver, on one hand it is therefore only possible for licensed sensors to register on a receiver and on the other hand, only a licensed receiver is able to perform the registration of a sensor. This ensures that only licensed receivers can access the keys from sensors that are in turn licensed.

Advantageously, the sensor sends its ID to the receiver, wherein the receiver uses the serial number contained in the ID to extract the keys assigned to this range of sensor serial numbers from the list of sensor keys.

It is particularly advantageous that the sensor sends encrypted data to the receiver with the transmission key and the receiver decrypts the encrypted data by using the transmission key. By registering the sensor on the receiver, the receiver is able to decrypt the transmitted data from the sensor by using the decrypted transmission key.

The transmission key that is used for data transmission between the sensor and the receiver can advantageously describe a symmetric encryption method. A symmetric key can be used to transfer data between the sensor and the receiver.

Preferably, the ID of the sensor and/or the ID of the receiver can be a MAC address. For example, the ID can thus be based on the EUI-64 standard (64-bit Extended Unique Identifier). For example, the first 24 bits can identify the manufacturer. The first 48 bits or 56 bits can identify, for example, ranges of serial numbers for sensors and/or ranges of serial numbers for receivers. For example, the last 16 bits or 8 bits can identify the serial numbers of sensors and/or the serial numbers of receivers. Thus, the range of serial numbers for sensors can be advantageously determined from the ID or MAC address of the sensor and/or the range of serial numbers for receivers can be determined from the ID or MAC address of the receiver.

It is particularly advantageous that the first key pair and/or the second key pair and/or the third key pair and/or the fourth key pair describe an asymmetric encryption method. It is also possible for the public and private keys belonging to each key pair to each be distributed the other way around, independently of each other. Thus, the respective private key could be a public key, and the respective public key could be a private key.

Random numbers can be used to generate the first key pair and/or the second key pair and/or the third key pair and/or the fourth key pair. For example, random numbers can be generated that form the private key of the corresponding key pair and are used in a similar way to generate the respective public key.

The transmission key can thus itself be a symmetric key which is encrypted with an asymmetric key when it is transmitted between the sensor and receiver. In addition, the keys for decrypting the encrypted transmission key can in turn be transmitted in encrypted form. In this case, the keys used for decryption can be stored in the list of sensor keys, which is in turn encrypted. This list of sensor keys is transmitted between the central body and the receiver in encrypted form. This encryption can also involve an asymmetric encryption method.

Advantageously, the MAC address and/or part of the MAC address of the sensor can be used to generate the second key pair and/or the MAC address and/or part of the MAC address of the receiver can be used to generate the fourth key pair. Thus, the bits of the MAC address which identify, for example, the ranges of serial numbers for sensors or the ranges of serial numbers for receivers, can be used to generate the second or fourth key pair. For example, these can be the first 48 bits or 56 bits of a MAC address according to the EUI-64 standard. In the course of the licensing of the sensor or the receiver, ranges of serial numbers can thus be assigned on the basis of the respective MAC addresses, wherein a corresponding key is generated using these MAC addresses or parts of the MAC addresses. For example, MAC addresses or parts of the MAC addresses can be used to generate keys according to an asymmetric encryption method, such as elliptical curve cryptography.

With the objects of the invention in view, there is concomitantly provided a system for transmitting data from a licensed sensor, in particular a licensed sensor according to the invention, to a licensed receiver, in particular a licensed receiver according to the invention, by involving a central body, the system comprising the sensor, the receiver, the central body including a computer system and a database, a data connection between the sensor and the receiver and a data connection between the receiver and the central body, the sensor sends data encrypted with the transmission key to the receiver, the receiver decrypts the data by using the transmission key, the transmission key is transferred from the sensor to the receiver during the registration of the sensor on the receiver, in particular a registration of the sensor on the receiver according to the invention, in particular according to a method of the invention.

The methods and the system can thus enable the licensing of the sensors and the receivers, wherein the secure delivery of the transmission keys for communication or data exchange between the sensors and the receivers can be ensured at the same time. The transmission key can therefore always be transmitted in encrypted form and there is no need to transmit it unencrypted as plain text. With the secure delivery of the transmission keys, the invention also advantageously makes it possible to establish a licensing model for sensors and receivers. The negotiation between sensors and receivers for authenticating the license is no longer necessary, which means that the methods according to the invention and the system according to the invention function even in the case of unidirectional communication from the sensor to the receiver.

Other features which are considered as characteristic for the invention are set forth in the appended claims.

Although the invention is illustrated and described herein as embodied in a method and a system for licensing and delivering keys for sensors and receivers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
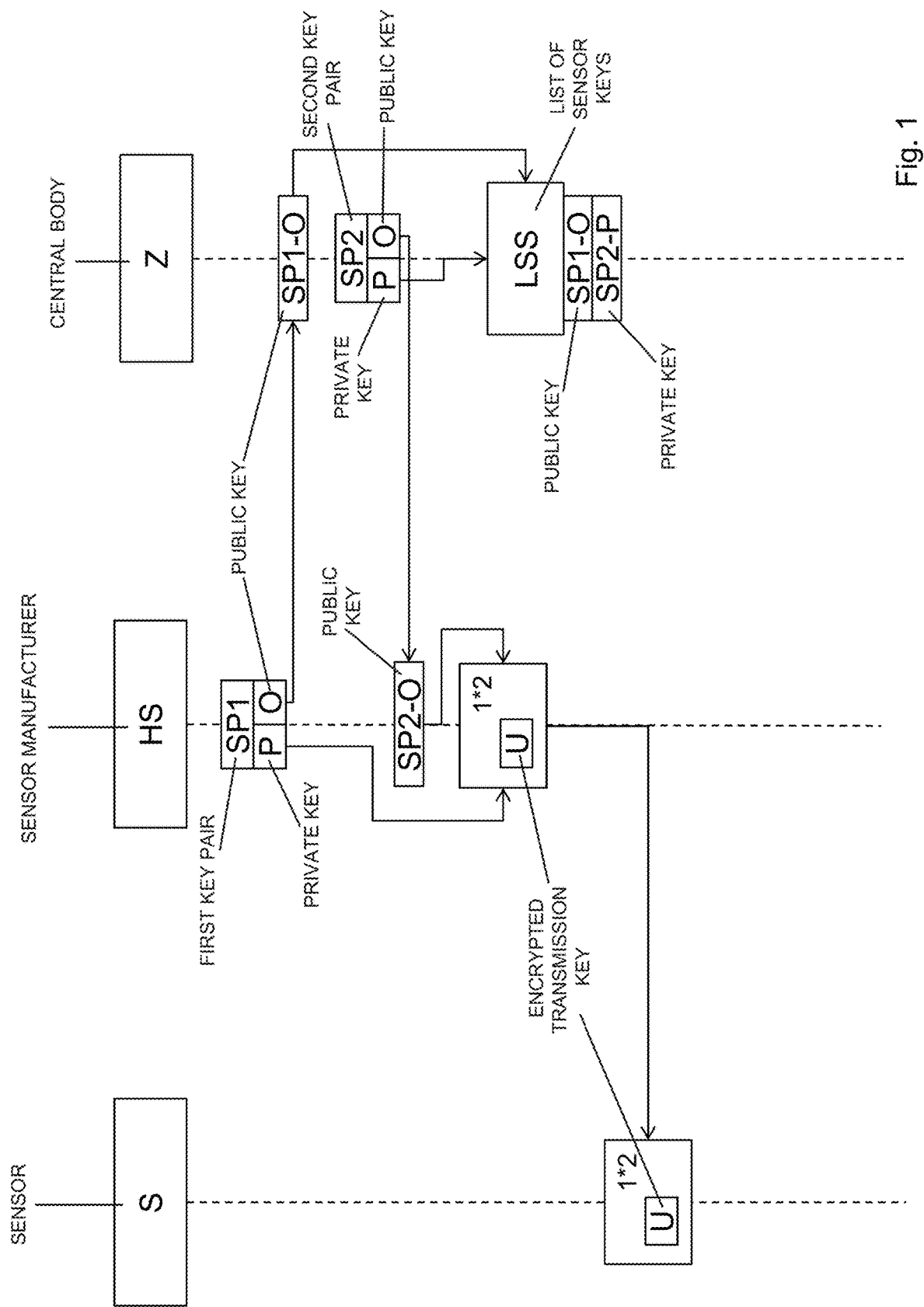
FIG. 1 is a highly simplified schematic representation of the licensing of a sensor at a central body.

Referring now to the figures of the drawings in detail and first, particularly, to FIG. 1 thereof, there is seen the licensing of a sensor S at a central body Z in a highly simplified schematic representation. In a first step the sensor manufacturer HS generates a first key pair SP1 formed of a private SP1-P and a public SP1-O key. The public key SP1-O of the first key pair SP1 is transmitted from the sensor manufacturer HS to the central body Z. The sensor manufacturer HS purchases a license for a range of sensor serial numbers SNS from the central body Z. The central body Z generates a second key pair SP2 based on the purchased range of sensor serial numbers SNS. In this case, the first 48 bits of the MAC addresses of the sensors S define a group for which the second key pair SP2 is valid. The public key SP2-O of the second key pair SP2 is then transmitted from the central body Z to the sensor manufacturer HS. The central body Z then stores the public key SP1-O of the first key pair SP1, the private key SP2-P of the second key pair SP2 and the assigned range of sensor serial numbers SNS in a list of sensor keys LSS. The sensor manufacturer HS encrypts a transmission key U, which is used for data transmission between the sensor S and a receiver E, with the private key SP1-P of the first key pair SP1 and the public key SP2-O of the second key pair SP2, and stores the encrypted transmission key U in the sensor S.

Figure 2:
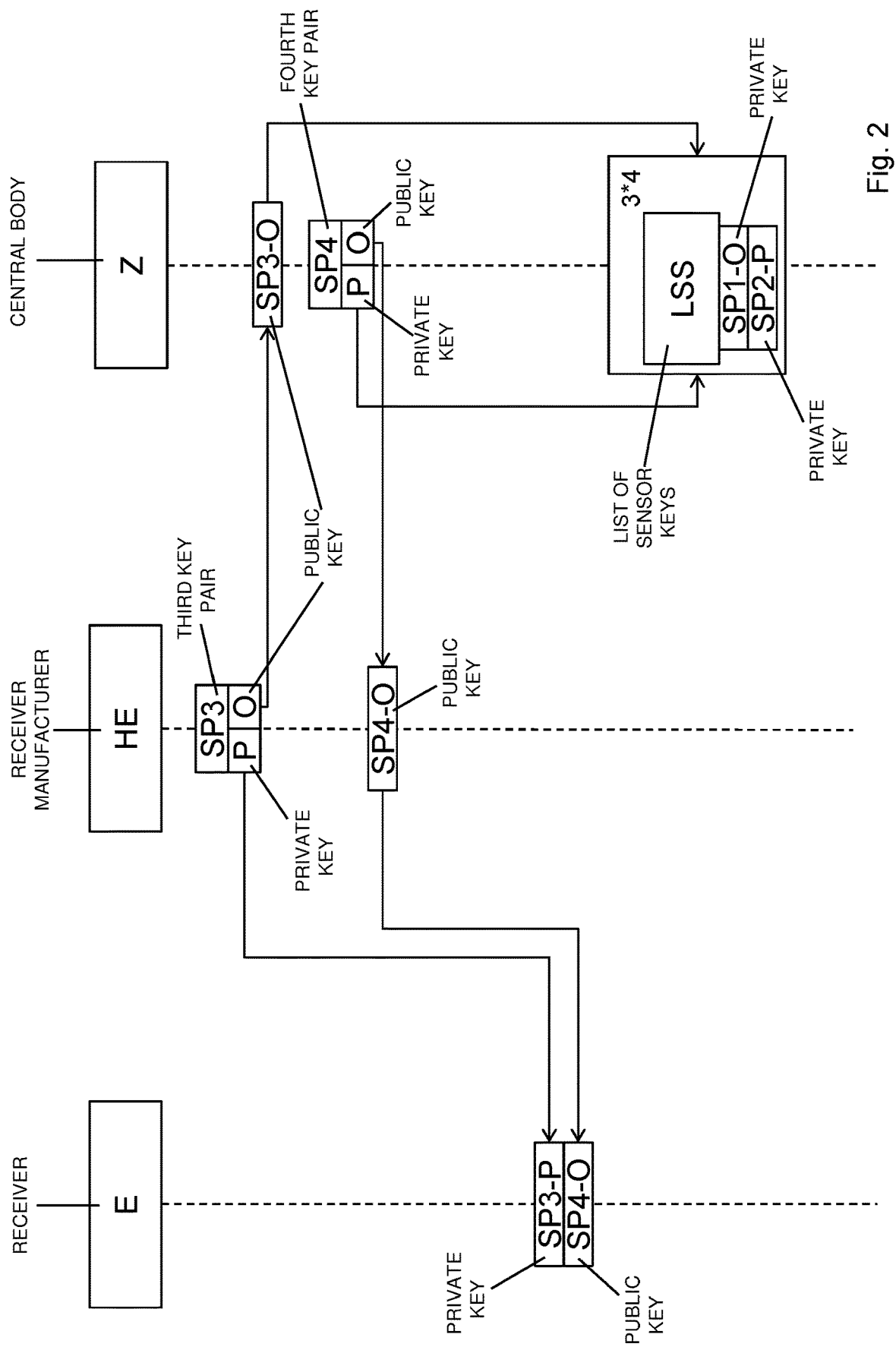
FIG. 2 is a highly simplified schematic representation of the licensing of a receiver at a central body and the provision of a list of sensor keys.

FIG. 2 shows the licensing of a receiver at a central body and the provision of a list of sensor keys in a highly simplified schematic representation. The receiver manufacturer HE generates a third key pair SP3, formed of a private SP3-P and a public SP3-O key. The public key SP3-O of the third key pair SP3 is transmitted from the receiver manufacturer HE to the central body Z. The receiver manufacturer HE purchases a license for a range of serial numbers for receivers SNE from the central body Z. The central body Z generates a fourth key pair SP4 based on the purchased range of receiver serial numbers SNE. In this case, the first 56 bits of the MAC addresses of the receivers E define a group for which the fourth key pair SP4 is valid. The public key SP4-O of the fourth key pair SP4 is then transmitted from the central body Z to the receiver manufacturer HE. The receiver manufacturer HE stores the private key SP3-P of the third key pair SP3 and the public key SP4-O of the fourth key pair SP4 in the receiver E. The list of sensor keys LSS is encrypted, signed and published by a certification authority using the public key SP3-O of the third key pair SP3 and the private key SP4-P of the fourth key pair SP4.

Figure 3:
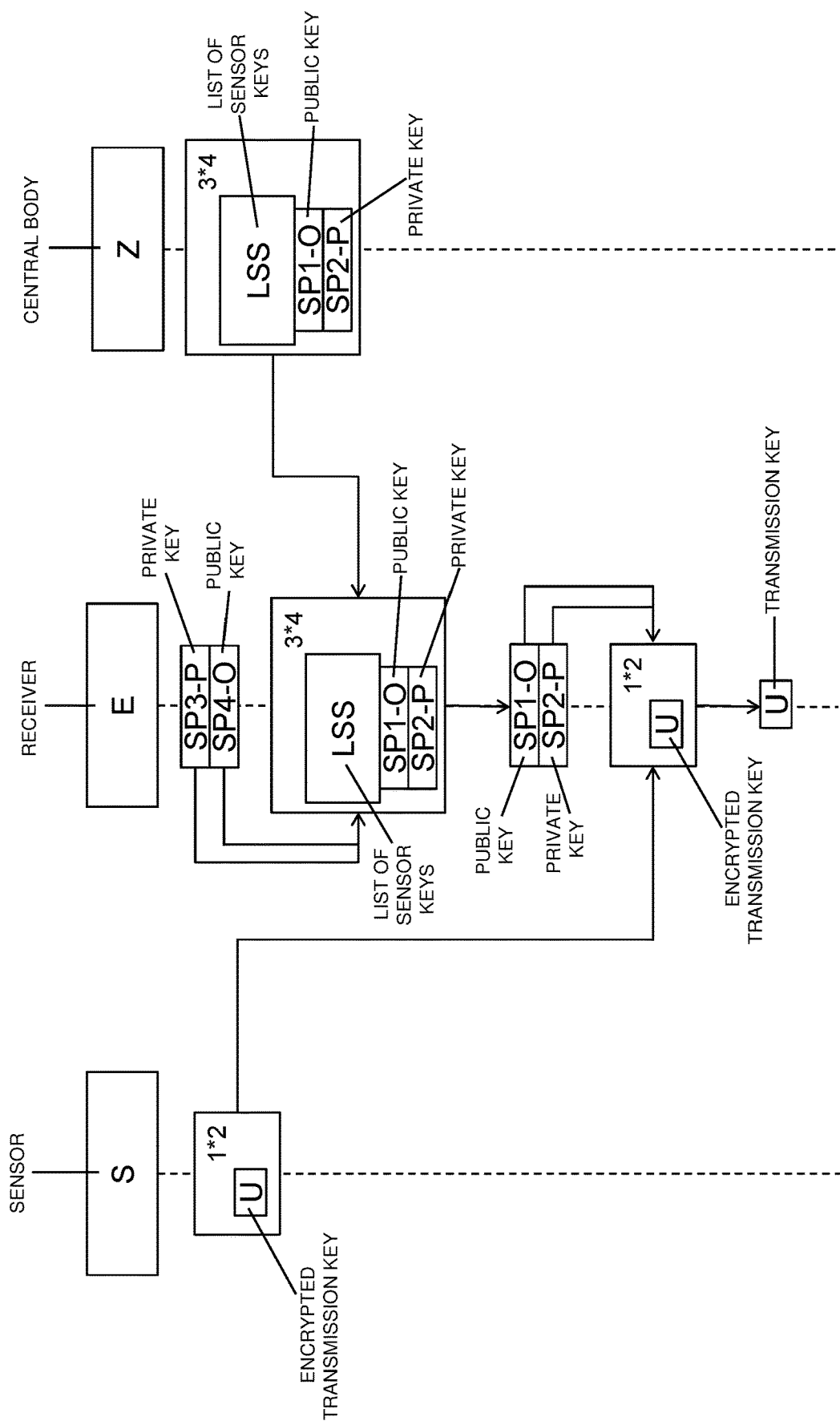
FIG. 3 is a highly simplified schematic representation of the registration of a licensed sensor on a licensed receiver.

FIG. 3 shows the registration of a licensed sensor S on a licensed receiver E in a highly simplified schematic representation. In a first step, the receiver E obtains the encrypted list of sensor keys LSS from the central body Z. The receiver E decrypts the list of sensor keys LSS using the private key SP3-P of the third key pair SP3 and the public key SP4-O of the fourth key pair SP4. The sensor S then transmits its ID and the encrypted transmission key U to the receiver E. Using the ID, the receiver E extracts the public key SP1-O of the first key pair SP1 corresponding to the sensor S and the private key SP2-P of the second key pair SP2 from the list of sensor keys LSS. The receiver E decrypts the encrypted transmission key U using the public key SP1-O of the first key pair SP1 and the private key SP2-P of the second key pair SP2. The transmission key U allows the receiver E to decrypt encrypted data sent by the sensor S.

Figure 4:
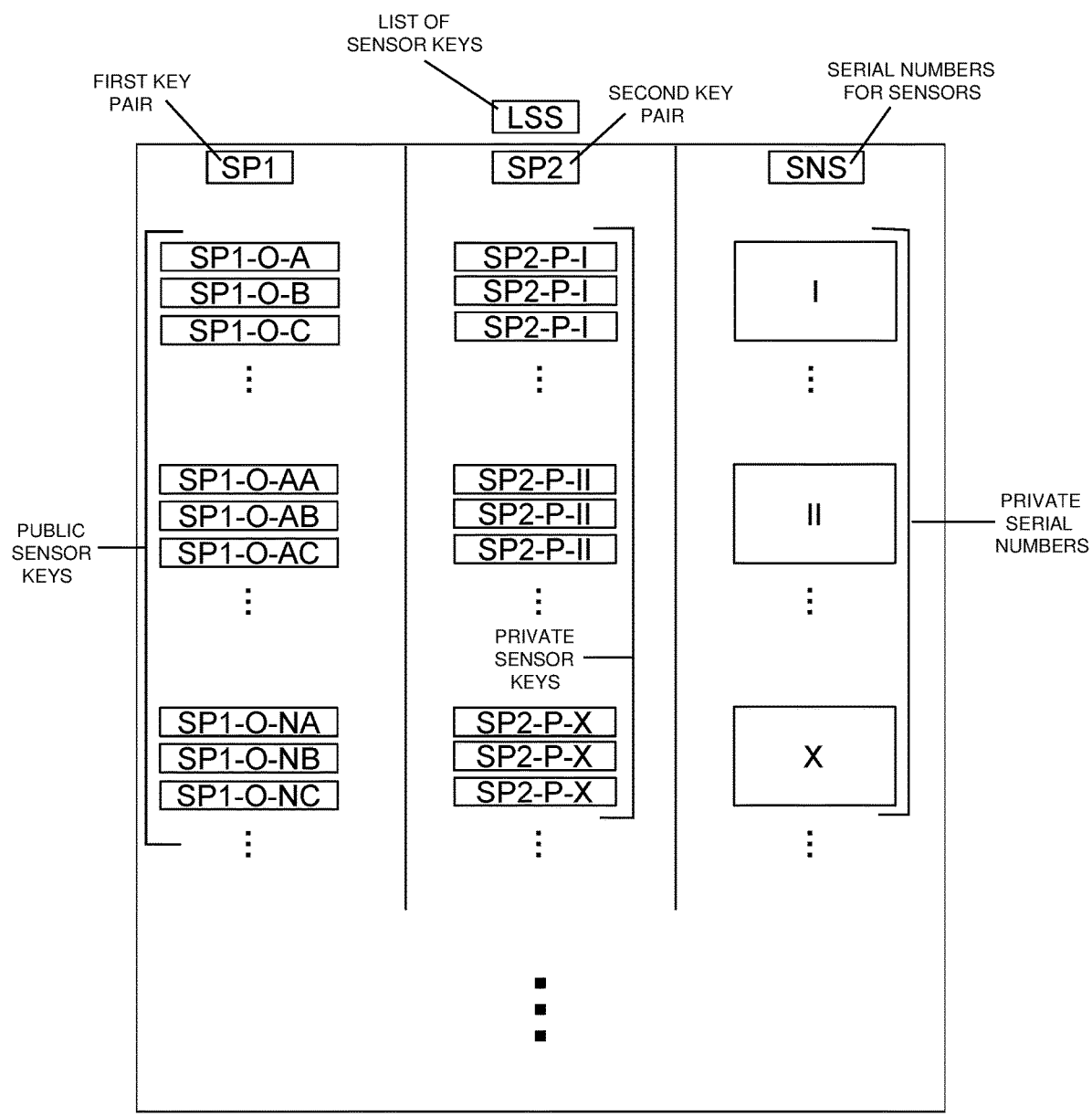
FIG. 4 is a highly simplified schematic representation of a list of sensor keys.

FIG. 4 shows a highly simplified schematic representation of a list of sensor keys LSS. For a plurality of sensors A-NC, the list of sensor keys LSS stores the corresponding public keys SP1-O of the first key pair SP1 and the private keys SP2-P corresponding to the ranges I-X of serial numbers for sensors SNS. For example, the serial numbers of the sensors A-C are located in the range I of serial numbers for sensors SNS. The second key pair SP2 for this range is identical for these sensors A-C in this range. Therefore, for each of the sensors A-C the private key SP2-P-I of the second key pair SP2 is stored. The serial numbers of the sensors AA-AC are analogously in the range 11 of serial numbers for sensors SNS and the serial numbers of the sensors NA-NC are in the range X of serial numbers for sensors SNS. With each licensed sensor S, an entry is added to the list of sensor keys LSS.

Figure 5A:
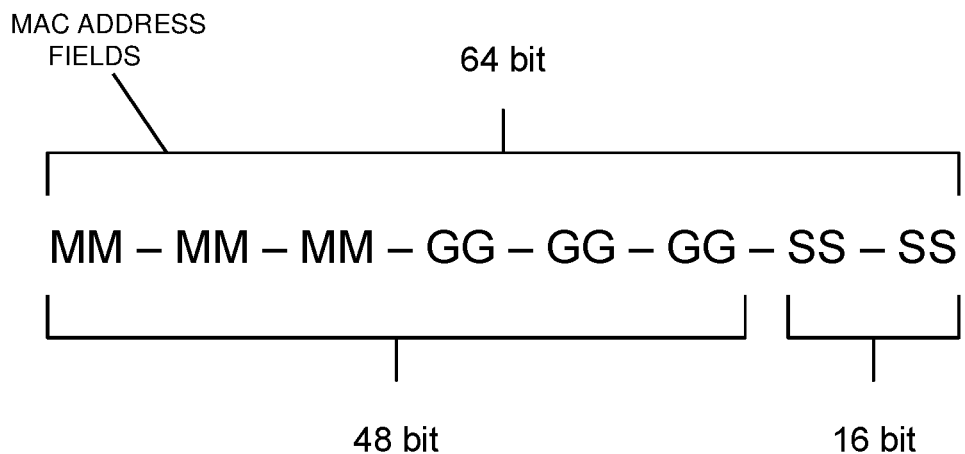
FIGS. 5A and 5B show partitions of MAC addresses into ranges of serial numbers.
Figure 5B:
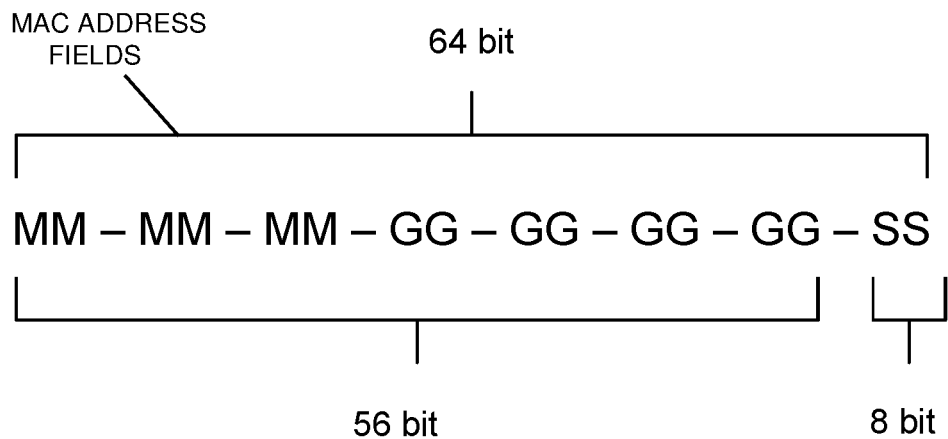

FIGS. 5A and 5B show partitions of MAC addresses into ranges of serial numbers. The MAC addresses have a length of 64 bits according to the EUI-64 standard. The MAC addresses are divided into three fields: the field MM represents the manufacturer, the field GG represents the group and the field SS represents the serial number. The MAC address in FIG. 5A has a prefix formed of the manufacturer field MM and group field GG of 48 bits. The serial number field SS has a length of 16 bits, defining a range of serial numbers for sensors SNS for $2^{16}=65536$ sensors S. For this range of sensor serial numbers SNS, a license can be sold by the central body Z. For example, the second key pair SP2 can be defined by this prefix.

The MAC address in FIG. 5B has a prefix formed of the manufacturer field MM and group field GG of 56 bits. The serial number field SS has a length of 8 bits, defining a range of serial numbers for receivers SNE for $2^{8}=256$ receivers E. For this range of receiver serial numbers SNE, a license can be sold by the central body Z. For example, the fourth key pair SP4 can be defined by this prefix.

The following is a summary list of reference numerals and the corresponding structure used in the above description of the invention.

LIST OF REFERENCE SIGNS

S sensor
E receiver
Z central body
HS sensor manufacturer
HE receiver manufacturer
SP key pair
LSS list of sensor keys
LES list of receiver keys
SNS range of serial numbers for sensors
SNE range of serial numbers for receivers
U transmission key
P private
O public
MM manufacturer
GG group
SS serial number

The invention claimed is:

1. A method for licensing a sensor at a central body, the method comprising:
providing:
the sensor having a unique ID including its unique serial number in a range of serial numbers for sensors, the sensor being able to act as a transmitter of encrypted data to a receiver,
the central body acting as a licensing body including a computer system and a database,
a sensor manufacturer including a computer system, and
a data connection between the sensor manufacturer and the central body;
keeping a list of sensor keys in the database of the central body;
generating a first key pair, formed of a private and a public key, at the sensor manufacturer;
transmitting the public key of the first key pair from the sensor manufacturer to the central body;
assigning a range of serial numbers for sensors to the first key pair;
generating a second key pair, formed of a private and a public key, at the central body for the range of serial numbers for sensors;
transmitting the public key of the second key pair from the central body to the sensor manufacturer;
assigning the range of serial numbers for sensors to the second key pair;

storing the public key of the first key pair, the private key of the second key pair and the assigned range of serial numbers for sensors in the list of sensor keys in the central body;

using the sensor manufacturer to encrypt a transmission key, used for an encrypted data transmission between the sensor and the receiver, with the private key of the first key pair and the public key of the second key pair, and to store the encrypted transmission key in the each individual sensor of the plurality of sensors; and using the sensor manufacturer:
to store the private key of the first key pair and the public key of the second key pair in each sensor of the plurality of sensors, or
to additionally store the transmission key unencrypted.

2. The method according to claim 1, which further comprises assigning the range of serial numbers for sensors to the sensor manufacturer by the central body when issuing a license.

3. A method for licensing a receiver at a central body, the method comprising:

providing:
the receiver having a unique ID including its unique serial number in a range of serial numbers for receivers, the sensor being able to act as a receiver of encrypted data from a sender,
the central body acting as a licensing body including a computer system and a database,
a receiver manufacturer including a computer system, and
a data connection between the receiver manufacturer and the central body;

generating a third key pair, formed of a private and a public key, at the receiver manufacturer;
transmitting the public key of the third key pair from the sensor manufacturer to the central body;
assigning a range of serial numbers for receivers to the third key pair;
generating a fourth key pair, formed of a private and a public key, at the central body for the range of serial numbers for receivers;
transmitting the public key of the fourth key pair from the central body to the receiver manufacturer;
assigning a range of serial numbers for receivers to the fourth key pair;
using the receiver manufacturer to store the private key of the third key pair and the public key of the fourth key pair in the receiver;
keeping a list of receiver keys in the database of the central body, and
storing the public key of the third key pair for each individual receiver of the range of serial numbers for receivers, the private key of the fourth key pair and the assigned range of serial numbers for receivers in the list of receiver keys in the central body.

4. The method according to claim 3, which further comprises providing the receiver with a unique ID including its unique serial number in the range of serial numbers for receivers.

5. The method according to claim 3, which further comprises assigning the range of serial numbers for receivers to the receiver manufacturer by the central body when issuing a license.

6. The method according to claim 3, which further comprises:

using the central body to encrypt the list of sensor keys with the public key of the third key pair and the private key of the fourth key pair.

7. The method according to claim 6, which further comprises using the central body to encrypt the list of sensor keys with the public key of the third key pair and the private key of the fourth key pair of each receiver having a key stored in the list of receiver keys.

8. The method according to claim 6, which further comprises using the central body to publish the list of sensor keys.

9. The method according to claim 6, which further comprises using a certification authority to sign the list of sensor keys.

10. A method for registering a sensor being licensed on a receiver being licensed by using a central body, the method comprising:

providing:
the sensor having a unique ID including its unique serial number in a range of serial numbers for sensors, the sensor being able to act as a transmitter of encrypted data to a receiver,
the receiver having a unique ID including its unique serial number in a range of serial numbers for receivers and being able to act as a receiver of encrypted data from a sender,
the central body acting as a licensing body including a computer system and a database,
a data connection between the sensor and the receiver, and
a data connection between the receiver and the central body;

providing a list of sensor keys according to claim 8;
using the receiver to obtain the list of sensor keys from the central body;
using the receiver to decrypt the list of sensor keys by using the private key of the third key pair and the public key of the fourth key pair;
using the sensor to transfer the stored encrypted transmission key to the receiver;
using the receiver to extract a public key of a first key pair corresponding to the sensor and a private key of a second key pair from the list of sensor keys; and
using the receiver to decrypt the encrypted transmission key using the public key of the first key pair and the private key of the second key pair.

11. The method according to claim 10, which further comprises using the sensor to send its ID to the receiver, and using the receiver to utilize the serial number contained in the ID to extract the keys assigned to the range of sensor serial numbers from the list of sensor keys.

12. The method according to claim 10, which further comprises using the sensor to send data encrypted with the transmission key to the receiver, and using the receiver to decrypt the encrypted data by using the transmission key.

13. The method according to claim 1, which further comprises using the transmission key to describe a symmetrical encryption method.

14. The method according to claim 12, which further comprises providing at least one of the ID of the sensor or an ID of the receiver as a MAC address.

15. The method according to claim 12, which further comprises at least one of determining the range of serial numbers for sensors from the ID or a MAC address of the sensor or determining the range of serial numbers for receivers from an ID or a MAC address of the receiver.

16. The method according to claim 1, which further comprises using at least one of the first key pair or the second key pair or a third key pair or a fourth key pair to describe an asymmetric encryption method.

17. The method according to claim 16, which further comprises at least one of using a MAC address or a part of a MAC address of the sensor to generate the second key pair or using a MAC address or a part of the MAC address of the receiver to generate the fourth key pair.

18. The method according to claim 1, which further comprises sending data encrypted with a transmission key by the licensed sensor to the licensed receiver;

decrypting by the licensed receiver the data by using the transmission key; and transferring the transmission key from the licensed sensor to the licensed receiver during a registration of the licensed sensor on the licensed receiver.

* * * * *